United States Patent [19]

Williams, Jr.

[11] Patent Number: 5,530,630
[45] Date of Patent: Jun. 25, 1996

[54] APPARATUS FOR LIGHTING A VEHICLE WHEEL

[76] Inventor: Harry L. Williams, Jr., Box 241 R.R. 1, Bloomfield, Iowa 52537

[21] Appl. No.: 431,672

[22] Filed: May 2, 1995

[51] Int. Cl.$^6$ ........................................ B60Q 1/26
[52] U.S. Cl. .............................. 362/78; 362/72; 439/16; 439/22; 439/34
[58] Field of Search ............... 362/72, 78, 35, 362/192, 193; 439/13, 16, 22, 23, 34

[56] References Cited

U.S. PATENT DOCUMENTS

| | | | |
|---|---|---|---|
| D. 332,441 | 1/1993 | Douglas, Jr. | D12/204 |
| 2,083,514 | 6/1937 | Brown | 362/78 |
| 3,099,401 | 7/1963 | Bell | 362/78 |
| 3,340,389 | 9/1967 | Senseman | 362/78 |
| 4,763,230 | 8/1988 | Cummings et al. | 362/72 |
| 4,881,153 | 11/1989 | Scott | 362/78 |
| 5,122,673 | 6/1992 | Scott | 362/78 |

*Primary Examiner*—Denise L. Gromada
*Assistant Examiner*—Alan B. Cariaso
*Attorney, Agent, or Firm*—Zarley, McKee, Thomte, Voorhees, & Sease

[57] ABSTRACT

An apparatus for lighting a wheel rotatably mounted on a frame of a vehicle includes a source of current mounted on the frame of the vehicle, a commutator mounted to the wheel for rotation therewith, at least one light bulb connected to the commutator and secured for rotation therewith, a brush electrically connected to the source of current and mounted to the frame adjacent the commutator. The brush has a contact portion for contacting the commutator to provide a flow of current from the battery to the commutator so as to power the light bulb. The apparatus is adaptable to car, motorcycle and semi-truck wheels, whether the wheels are mounted as singles or as duals.

16 Claims, 4 Drawing Sheets

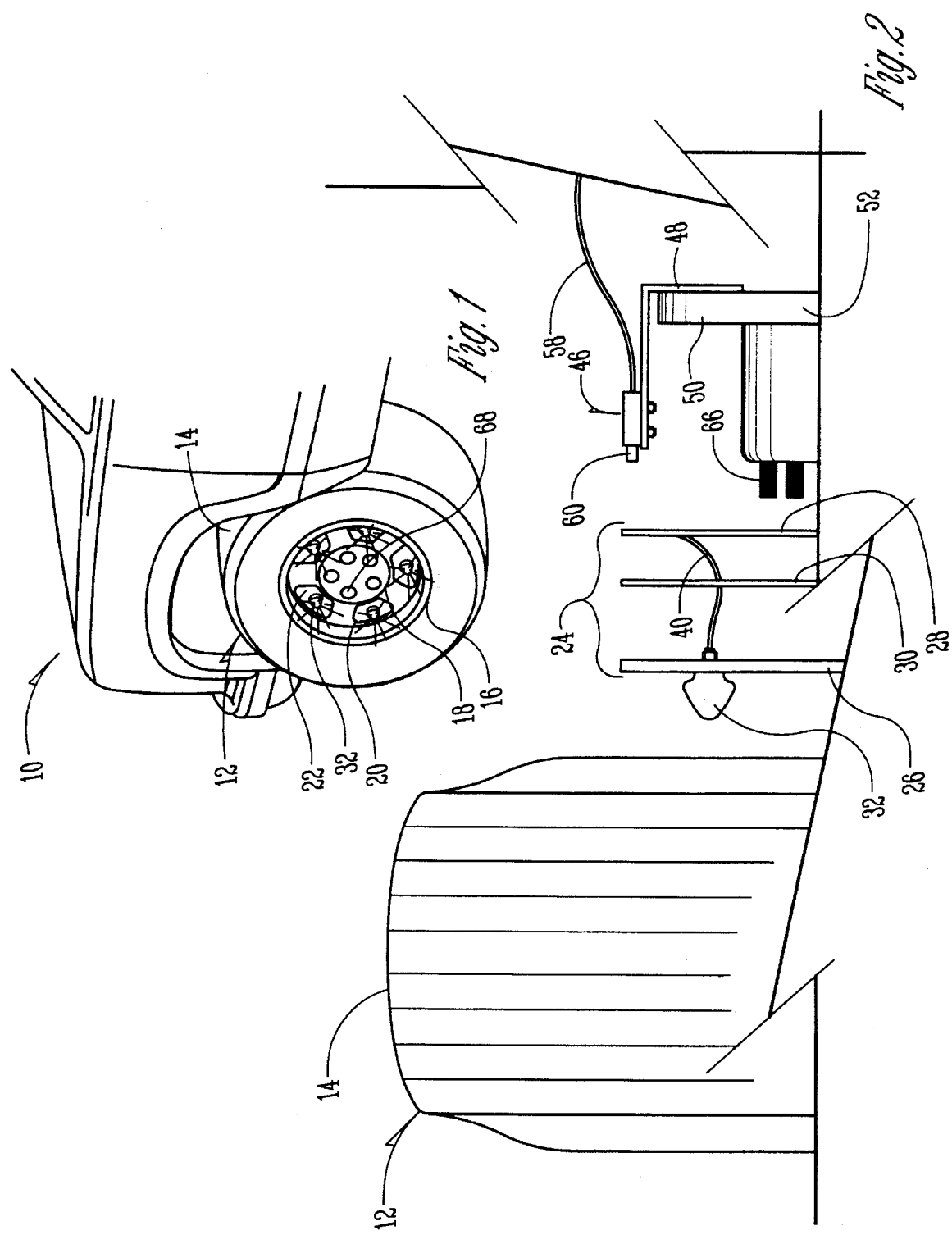

APPARATUS FOR LIGHTING A VEHICLE WHEEL

BACKGROUND OF THE INVENTION

The present invention relates to an apparatus for lighting a wheel on a vehicle. A lighted wheel makes the vehicle more visible from the side, particularly at night.

Manufacturers have relied on passive reflectors to make vehicles more visible from the side. Typically, governmental regulations require that these reflectors be red or yellow in color. Reflectors merely reflect any light directed at them, they do not actively project light. In the dark, a vehicle having side reflectors tends go undetected until the headlights of an approaching vehicle strike the reflectors. Thus, light may not strike the reflectors until a collision is imminent.

Some vehicles include parking lights on the sides of their bodies. Parking lights actively project light rather than merely reflect it. Therefore, parking lights generally make the vehicle more discernible than reflectors. A battery stationarily mounted on the vehicle provides electrical power for the parking lights. However, attaching lights to the wheel(s) of a vehicle has heretofore been problematic due to the rotation of the wheel(s) with respect to the vehicle's battery.

U.S. Pat. No. 4,763,230, which issued to Cummings et al., discloses a wheel lighting apparatus that draws power from a small DC battery mounted on the wheel. Unfortunately, such a wheel lighting apparatus has several shortcomings. Providing an extra battery for each wheel to be lit is costly and unnecessarily redundant when the vehicle already has a main DC battery. The size and therefore power of a wheel-mounted battery is severely limited. Care must be taken not to adversely impact the rotational balance of the wheel. Furthermore, a wheel-mounted battery is susceptible to damage from road debris or the high centrifugal forces produced as the wheel rotates.

Therefore, a primary object of this invention is the provision of an apparatus for lighting a rotatable wheel on a vehicle with electrical power from a battery that does not rotate with the wheel.

Another object of this invention is the provision of an apparatus for lighting a wheel of a vehicle wherein the main vehicle battery supplies direct current across a brush connection to power one or more lights installable on a commutator mounted on the rotatable wheel.

These and other objects will be apparent to one skilled in the art from the description which follows and the accompanying drawings.

SUMMARY OF THE INVENTION

The present invention is an apparatus for lighting a wheel rotatably mounted on a frame of a vehicle. The apparatus comprises a source of current mounted on the frame of the vehicle, a commutator mounted to the wheel for rotation therewith, at least: one light bulb connected to the commutator and secured for rotation therewith, and a brush electrically connected to the source of current and mounted to the frame adjacent the commutator. The brush has a contact portion for contacting the commutator to provide a flow of current from the battery to the commutator so as to power the light bulb. A spring means connected to one of the contact portion and commutator urges them into contact.

The present invention is adaptable to cars, motorcycles, and trucks having single or dual wheels. Vehicles equipped with the present invention are more attractive and visible, especially at night.

BRIEF DESCRIPTION OF THE DRAWINGS

FIG. 1 is a perspective view showing a portion of the side of a vehicle having wheels lit by the apparatus of this invention.

FIG. 2 is an exploded assembly view of the wheel lighting apparatus of this invention as applied to a typical vehicle wheel equipped with a drum-type brake.

DETAILED DESCRIPTION OF THE PREFERRED EMBODIMENTS

Figure 3:
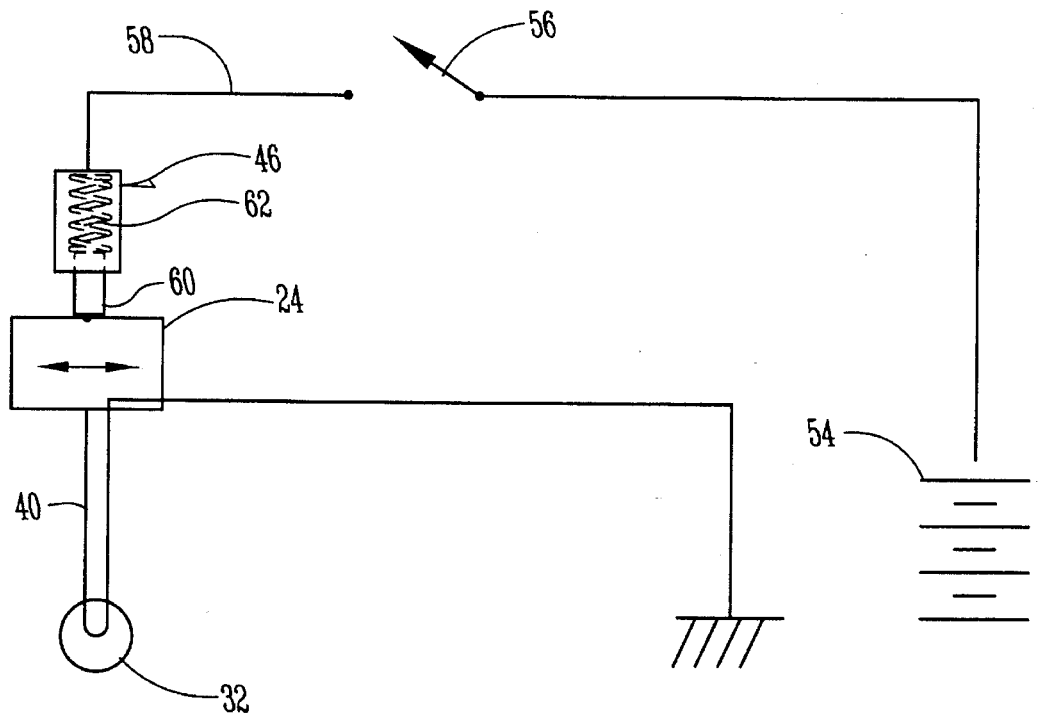
FIG. 3 is an electrical schematic diagram of the wheel lighting circuit according to this invention.

The present invention will now be shown and described with reference to several preferred embodiments thereof, and with reference to the accompanying drawings. In the drawings, like parts and features are denoted by like reference numerals.

A portion of a vehicle 10 can be viewed from the side in FIG. 1. The vehicle 10 includes a wheel 12 that is rotatably mounted to the frame of the vehicle 10. As is conventional, the wheel 12 includes a tire 14 mounted on a rim 16. The rim 16 has a central portion 18 for mounting the wheel 12 to the axle of the vehicle 10 in a conventional manner.

Most conventional rims 16 have openings 20, which are provided between the central portion 18 and the tire 14. In the case of cast aluminum alloy wheels the openings may follow a specific decorative pattern. In other cases, a plurality of spokes may radially diverge from the central portion 18 and/or cross to form a decorative pattern having openings between the spokes. The lighting apparatus 22 of this invention is mounted behind these openings 20 (between the rim 16 and the axle of the vehicle 10) so that some components, particularly the lights of the apparatus, rotate with the wheel 12 and can be seen through the openings 20.

The exploded assembly view of FIG. 2 illustrates the basic construction of the lighting apparatus 22 in greater detail. The lighting apparatus 22 comprises a commutator 24 mounted to the wheel 12 for rotation therewith. The commutator 24 comprises a grounding plate 26, a power ring 28 and an insulating means 30 sandwiched therebetween so as to electrical isolate the plate 26 from the power ring 28. Means 30 comprises a ring of nonconductive material, such as plastic, which is adhered or otherwise attached to one or both of the power ring 28 and the plate 26.

One or more light bulbs 32 are secured to the grounding plate 26 of the commutator 24 and electrically connected to the grounding plate 26 and the power ring 28. Although the light bulb 32 itself is not the subject of this invention, its selection is important. Bulbs with red or amber covers are preferred because those colors comply with existing safety regulations. Lighted bullet studs, such as those available from East Moline Wholesale, Inc. of East Moline, Ill., U.S.A. under Part No. 048-5053 A (amber) or 048-5053 R (red) have been found to be suitable and are preferred for the lighting apparatus of the present invention.

Figure 4:
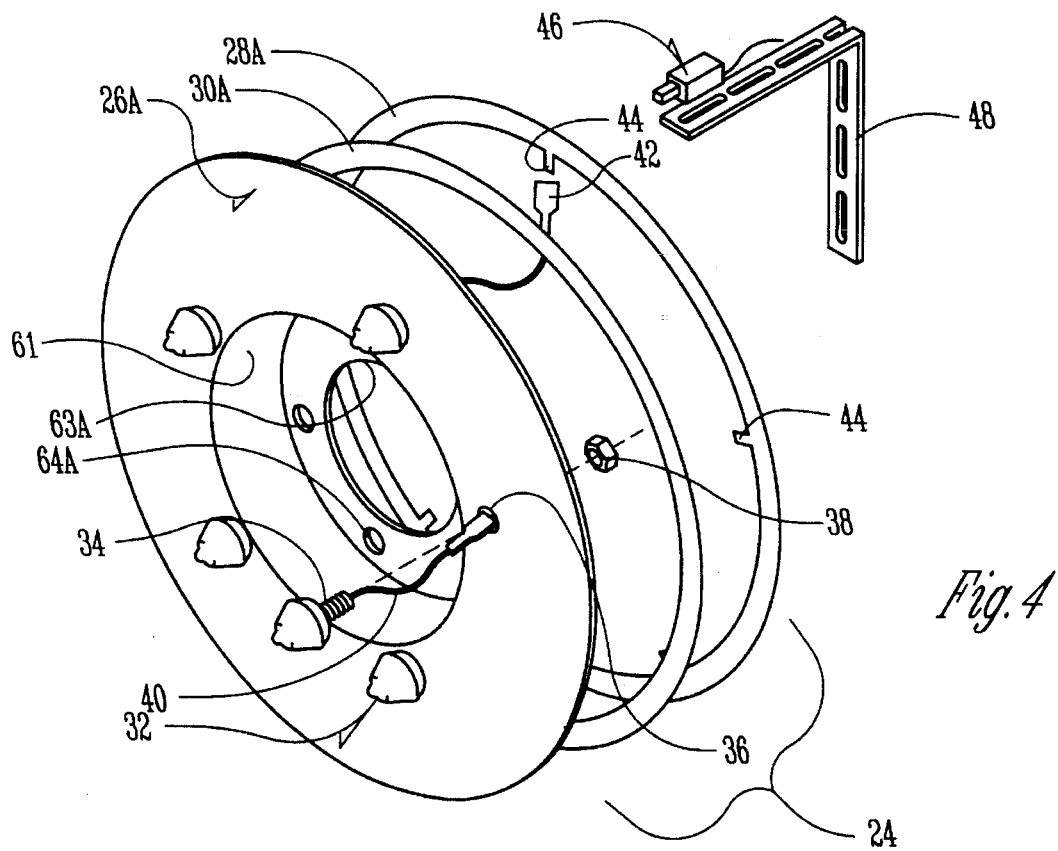
FIG. 4 is an exploded assembly view showing the components of the apparatus of FIG. 2 from a different perspective.

The lighted bullet studs or light bulbs 32 are more clearly shown in FIG. 4. The stud 32 has a threaded end 34 which is passed through a hole 36 in the grounding plate 26. A nut 38 mates with the threaded portion 34 and secures the lighted bullet stud 32 to the grounding plate 26. A lead wire 40 extends from the light bulb 32 and has a connector 42 on its free end. The connector 42 electrically connects the power ring 28 to the light bulb 32 through a connector tab 44 provided on the power ring.

Figure 5:
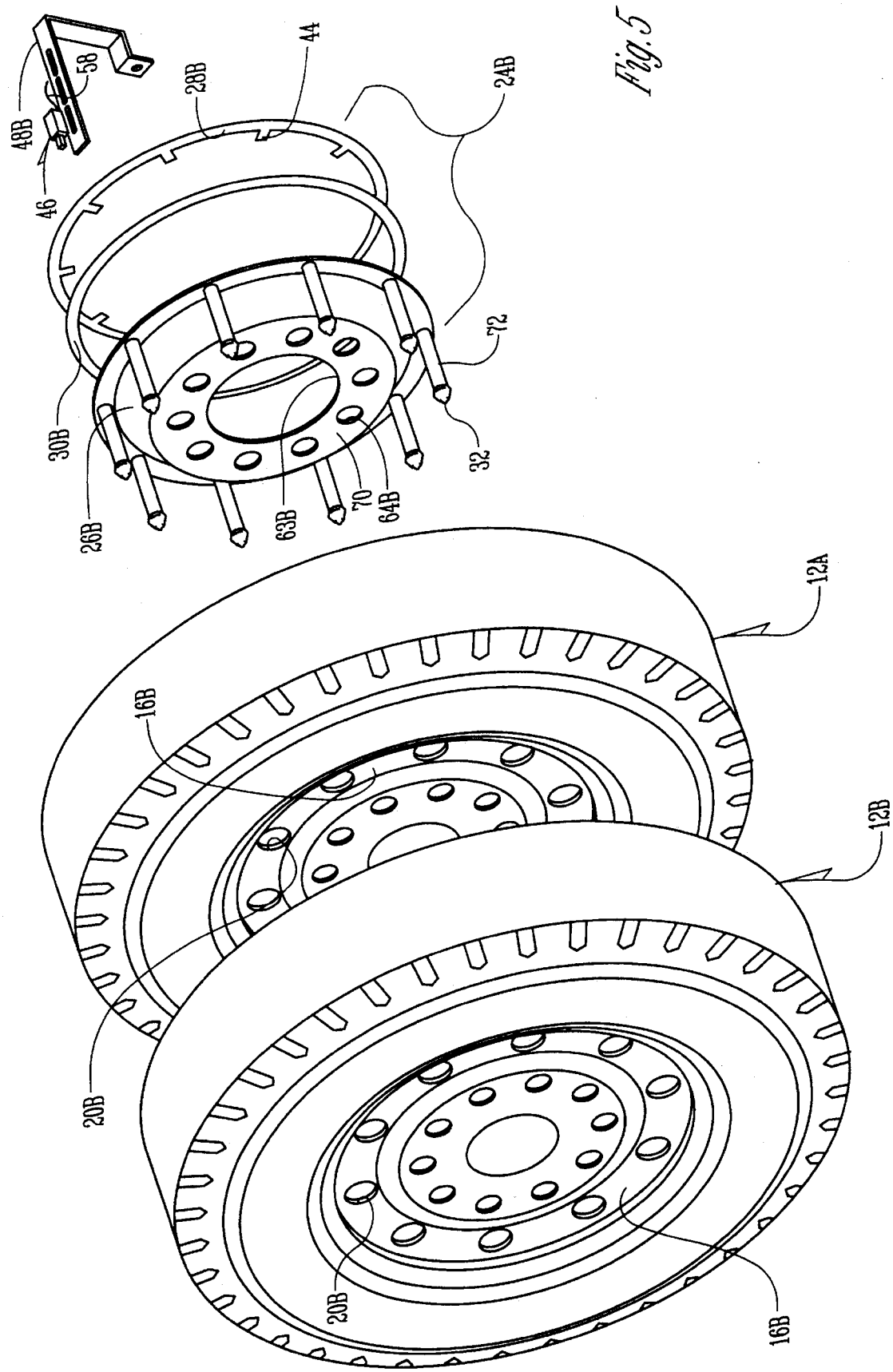
FIG. 5 is an exploded assembly view of an embodiment wherein the apparatus of this invention has been adapted for use on dual wheels like found on semi-trucks.
Figure 6:
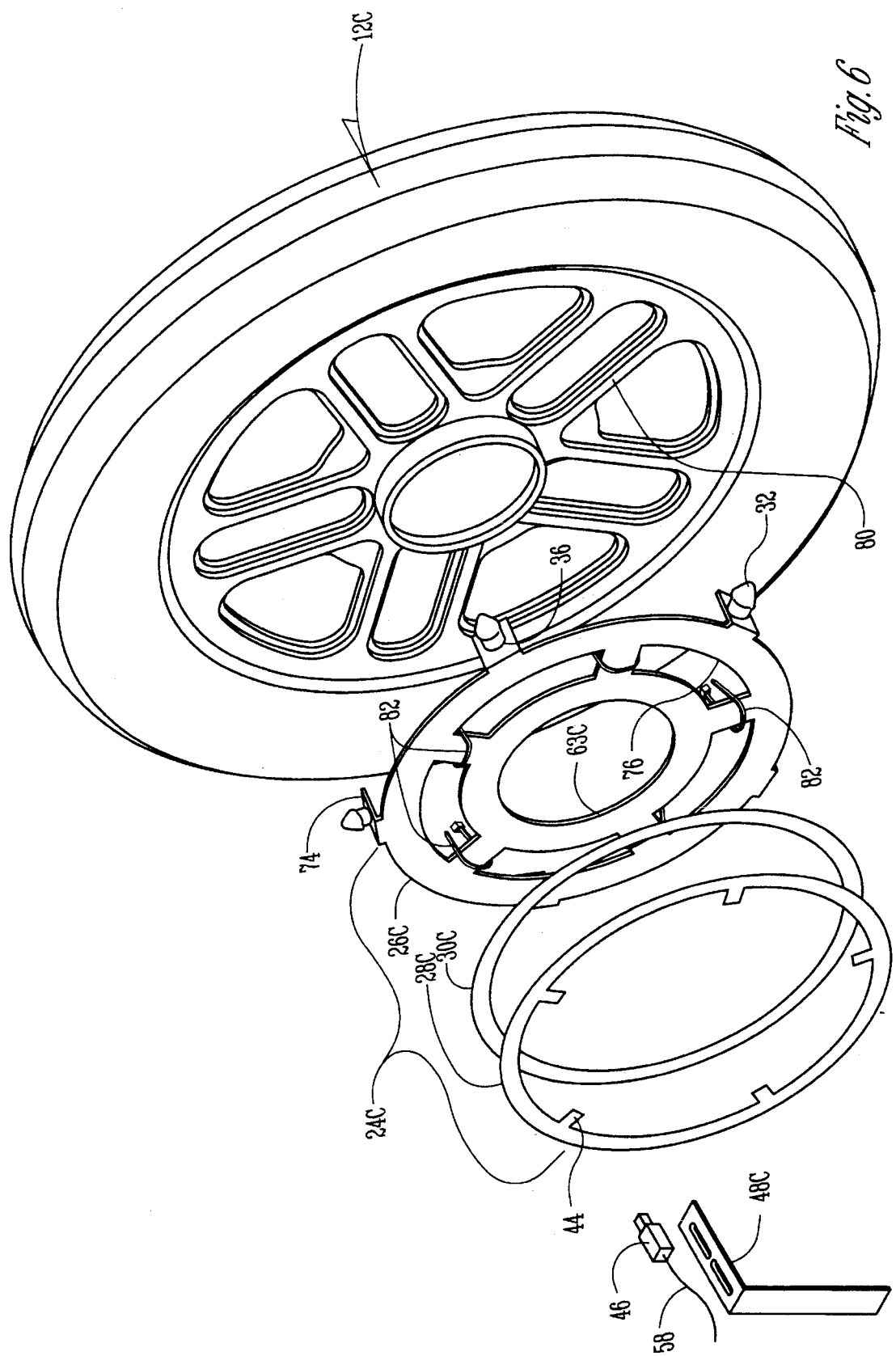
FIG. 6 is an exploded assembly view of an embodiment wherein the present invention has been adapted for use on motorcycle wheels.

Referring again to FIG. 2, a brush 46 mounts to a stationary portion of the frame of the vehicle 10. The brush 46 has a housing as shown, but is otherwise a conventional electromechanical brush such as Lamb Motors #L-33308. Preferably, a bracket 48 fastens the brush 46 to a flange 50 on the brake housing 52. The bracket 48 can be adapted to mount to a vehicle having either disc or drum brakes. Furthermore, the bracket can be adapted to mount to another stationary portion of the frame if attachment to the brake housing 52 is not possible or desirable. The bracket 48 juxtapositions the brush 46 into alignment with the power ring 28 of the commutator 24. As seen in FIGS. 4–6, the bracket 48 can be adapted to mount to a variety of stationary locations on a given vehicle or on different vehicle. Slots in the bracket 48 allow the position of the brush 46 to be adjusted.

FIG. 3 illustrates the electrical circuit of the present invention. A source of electrical current 54, including but not limited to a 6, 12, or 24 volt battery, a generator, or the like, is stationarily mounted on the frame of the vehicle 10 in a conventional manner. The battery 54 supplies current through a switch 56 to the brush 46. Lead line 58 extends from the switch 56 to the brush 46.

One advantage of the present invention is its flexibility. Switch 56 can comprise a simple toggle switch (not shown) mounted separately on a instrument panel within the driver's reach or the switch 56 can be integrated with existing instrument panel switches used for other purposes, such as the switch for other lights on the vehicle. Furthermore, the switch 56 can simultaneously control lights on a plurality of vehicle wheels, if so desired.

The current supplied to the brush 46 is transferred to the commutator 24 by means of a contact portion 60, which extends from the brush 46 so as to normally contact the power ring 28 of the commutator 24 (see FIG. 2). The contact portion 60 appears as a rectangular bar in the preferred embodiments of FIGS. 2, 4–6, but other shapes such as a cylindrical rod can also be utilized.

Preferably, a spring means 62 urges the contact portion of the stationary brush 46 into contact with the power ring 28 so that contact is maintained even while the commutator rotates with the wheel 12. As is apparent from FIG. 4, the brush 46 can be adjusted laterally with respect to the vehicle 10 so as to establish proper mechanical, and consequently electrical, contact with the power ring 28. After this initial adjustment, the spring means 62 yieldably holds the contact portion 60 of the brush 46 in contact with the power ring 28.

Once the current is transferred to the commutator 24, it flows from the power ring 28 to the light bulb 32 via the lead wire 40. Finally, the current returns to ground via the grounding plate 26, which is electrically connected to the chassis of the vehicle 10. The unique brush and commutator assembly of the present invention provides current from a stationary battery to power one or more lights on a rotating wheel. A plurality of wheels 12 on the vehicle 10 can have lights powered in this manner, preferably by a single battery.

There are a variety of types or classes of wheeled vehicles. The basic apparatus of this invention is easily adaptable to fit on any size or type of vehicle. Embodiments of the lighting apparatus 22 adapted to a car wheel (including vans and pickups not equipped with dual wheels), a semi-truck dual wheel and a (motor)cycle wheel are shown in FIG. 4, FIG. 5 and FIG. 6, respectively.

In FIG. 4, the grounding plate 26A for a car wheel has a concave shape in order to project the light bulbs 32 into the openings 20 of the rim 16, as best seen in FIG. 1. Referring again to FIG. 4, the dished central portion 61 of the grounding plate 26A includes a plurality of holes 64A for accommodating the lug bolts 66 of the vehicle's axle. A central opening 63A is provided for the spindle or axle of the vehicle, to which the lug bolts are typically attached.

The installation of the apparatus 22 generally proceeds as follows. The brush 46 is installed on the stationary frame of the vehicle 10, such as on the disk or drum brake housing 52. Thereafter, the commutator 24A is installed by aligning the holes 64A with the lug bolts 66 and pushing the commutator on them in the direction of the vehicle (see FIGS. 2 and 4).

Next, the wheel 12 is installed adjacent the commutator 24 on the lug bolts 66 and the lug nuts 68 are tightened (see FIGS. 1 and 2). The user marks the outline of the openings 20 and the desired locations of the holes 36 in the rim 16 on the face of the grounding plate 26 therebehind. The user then removes the wheel 12, and the commutator 24, drills the holes 36 in the grounding plate 26 and installs the light bulbs 32 through the holes 36 as shown in FIG. 4. The connectors 42 are attached to the corresponding tabs 44 on the power ring 28.

Then the fully assembled commutator 24 is reinstalled on the lug bolts 66. When the wheel 12 is subsequently installed on the lug bolts 66 and properly aligned, the lights 32 will be visible through the openings 20 of the rim 16. At rest or while rotating, the wheel 12 is supplied with power for the lights 32 by the spring loaded brush 46 when the switch 56 (see FIG. 3) is closed.

The front wheels of a semi-truck typically comprise a single steerable wheel at each end of the axle. Although generally larger in diameter than car wheels, the front wheels of semi-trucks will accept the lighting apparatus 22 with few modifications. In addition to the obvious size modification, the grounding plate 26A must be convex instead of concave because of the way the front semi wheels are attached to their axle.

FIG. 5 illustrates an embodiment of the present invention adapted for the dual wheels 12A, 12B of a semi-truck. A modified bracket 48B is provided for mounting the brush 46 to the brake drum or another suitable stationary portion of the vehicle 10. The power ring 28B, the insulating means 30B and the grounding plate 26B are all sized so as to fit the dual wheels 12A, 12B of a semi-truck.

The grounding plate 26B is convex in shape and includes a central outwardly protruding portion 70 having a plurality of holes 64B therein for receiving the lug bolts 66 (see FIG. 2). In this embodiment, each bulb 32 is mounted on an end of a finger 72 extending from the grounding plate 26B of the conmmutator 24B. The shape of the grounding plate 26B and the outward projection of the light bulbs 32 are necessary to extend the lights through the inner wheel 12A of the dual wheels 12A, 12B and into the outer wheel 12B where they will be visible from the side of the vehicle.

The installation of the lighting apparatus on dual wheels proceeds as already described except both wheels 12A and 12B must be removed before the commutator is installed. If the openings 20B in the rims 16B are not already there or marked both wheels must be reinstalled before the openings can be marked.

FIG. 6 illustrates a motorcycle embodiment of the lighting apparatus 22 of the present invention. Again, the bracket 48C is modified to mount the brush 46 to an appropriate stationary portion of the motorcycle and adjacent the power ring 28C. The power ring 28C, the insulating means 30C and the grounding plate 26C are of suitable size and shape to fit a motorcycle wheel 12C.

The grounding plate 26C has one or more tabs 74 on its periphery. The tabs 74 are preferably bent over in one direction so as to extend between the spokes 80 or similar rotating structures of the wheel 12C. Thus, the tabs 74 accomplish a function similar to the holes 64A or 64B. The tabs 74 include a hole 36 therein for receiving the light bulb 32. Mounting the light bulbs 32 in this manner makes them visible from either side of the motorcycle.

The commutator 24C operates in substantially the same manner as the embodiment for cars. A plurality of equally spaced apertures 76 can be provided in the grounding plate 26C to reduce its weight. One skilled in the art will appreciate that a motorcycle is only one kind of wheeled cycle. The motorcycle embodiment of this invention is equally applicable to other types of wheeled cycles, such as unicycles, bicycles, tricycles, etc., which have spokes and a battery or other source of current mounted on the vehicle.

The lighting apparatus 22 installs on a cycle quite simply. The wheel 12C is removed from the axle or forks, the commutator 24C is assembled and installed secured by conventional means, such as a plurality wire ties or mounting straps 82, against one side of the wheel so the tabs 74 extend through the spokes. Then the wheel 12C with the commutator 24C thereon is reinstalled on the cycle. Finally, the brush is mounted to a stationary part of the cycle, connected to the battery and adjusted to contact the power ring 28C.

An alternate embodiment of the basic invention is contemplated wherein a spring means is operably connected to the power ring 28 so as to spring load the power ring 28 into contact with a stationary brush contact portion 60.

Whereas the invention has been shown and described in connection with the preferred embodiments thereof, it will be understood that modifications, substitutions, and additions may be made which are within the intended broad scope of the following claims. From the foregoing, it can be seen that the present invention accomplishes at least all of the stated objectives.

What is claimed is:

1. An apparatus for lighting a vehicle wheel assembly, comprising:

a hub rotatably mounted on a stationary frame of a vehicle;

a source of electrical power on the frame;

a commutator mounted on the hub and comprising an electrically conductive grounding plate and an electrically conductive power ring mounted in parallel and superposed relation to the grounding plate and separated from the grounding plate by a nonconductive insulation material;

a light bulb electrically connected to the power ring and the grounding plate;

a brush electrically connected to the source of power and mounted on the frame to engage the power ring; and a wheel rim having inner and outer sides mounted on the hub such that the inner side is adjacent the grounding plate and the outer side is remote from the hub, the wheel rim having at least one opening therein so that light from the light bulb can be seen from the outer side of the wheel rim.

2. The apparatus of claim 1 wherein the brush includes a moveable contact portion and a spring operatively connected to one of the contact portion of the brush and the commutator for urging the contact portion and the commutator into contact.

3. The apparatus of claim 1 wherein the grounding plate is circular and has opposing substantially planar faces.

4. The apparatus of claim 1 wherein the power ring is a continuous circular ring having opposite substantially planar faces.

5. The apparatus of claim 1 wherein the insulation material is a continuous circular ring.

6. The apparatus of claim 1 wherein the grounding plate is circular and has opposite substantially planar faces and the power ring is a continuous circular ring having opposite substantially planar faces and the insulation material comprises a continuous circular ring of nonconductive material fixed to one of the faces of one of the power ring and the grounding plate.

7. The apparatus of claim 1 wherein the wheel rim is mounted to the hub by a plurality of lug bolts and lug nuts, the grounding plate having a plurality holes formed therein for receiving lug bolts of the wheel so as to mount the grounding plate adjacent the inner side of the wheel rim and thereby behind the wheel rim.

8. The apparatus of claim 1 wherein the grounding plate is concave.

9. The apparatus of claim 1 wherein the grounding plate has opposing faces and the light bulb is mounted on one of the faces.

10. The apparatus of claim 1 wherein the light bulb is registered with the opening in the wheel rim and extends thereinto.

11. The apparatus of claim 1 wherein the grounding plate has at least one socket therein for electrically connecting and receiving the light bulb therein.

12. The apparatus of claim 1 wherein the grounding plate and power ring share a common central axis and the power ring is in concentric superposed relation with the grounding plate.

13. The apparatus of claim 1 wherein the insulation material is sandwiched between and fixed to both the grounding plate and the power ring to form an integral rotatable unit.

14. An apparatus for lighting a cycle wheel, the cycle wheel being rotatably mounted on a frame and including a circular outer rim supported by a plurality of spaced spokes extending from a central hub, the apparatus comprising:

a source of electrical power mounted on the frame of the cycle;

a commutator having a central opening for receiving the hub, the commutator being secured to the spokes of the wheel so as to rotate with the wheel, the commutator comprising an electrically conductive grounding plate and an electrically conductive power ring mounted in parallel and superposed relation to the grounding plate and separated from the grounding plate by a nonconductive insulation material, the commutator having a periphery;

a plurality of light bulbs mounted on the periphery of the commutator so as to be visible between the spokes when the commutator is mounted to the wheel, the light bulbs being electrically connected to the power ring and the grounding plate; and a brush electrically connected to the source of power and mounted to the frame to engage the power ring, the brush having a contact portion for contacting the power ring to power the light bulb.

15. The apparatus of claim 14 wherein the grounding plate of the commutator has a periphery which defines the periphery of the commutator and includes a plurality of connector tabs extending therefrom, each of the tabs having a hole therein for mounting the light bulbs, the commutator being positioned adjacent the spokes of the wheel and the tabs being bent over to extend between the spokes and position the light bulbs in a substantially upright position.

16. An apparatus for lighting dual wheels on a vehicle having a frame and at least one axle mounted on the frame, the dual wheels being rotatably mounted at one end of the axle and including an inner wheel rim and an outer wheel rim both of which have a plurality of openings therein, the apparatus comprising:

a source of electrical power mounted on the frame;

a commutator mounted behind the inner wheel rim, the commutator comprising an electrically conductive grounding plate and an electrically conductive power ring mounted in parallel and superposed relation to the grounding plate and separated from the grounding plate by a nonconductive insulation material, the grounding plate having an outer face directed toward inner wheel rim with a plurality of protruding fingers thereon registered with the openings in the inner wheel rim and extending therethrough and into the openings of the outer wheel rim;

a light bulb mounted to each of the fingers at the extended end thereof, the light bulb being electrically connected with the power ring and the grounding plate;

a brush electrically connected to the source of power and mounted on the frame to engage the power ring.

* * * * *